United States Patent [19]
Petty

[11] Patent Number: 5,859,392
[45] Date of Patent: Jan. 12, 1999

[54] METHOD AND APPARATUS FOR REDUCING NOISE IN AN ELECTROSTATIC DIGITIZING TABLET

[75] Inventor: William K. Petty, Colorado Springs, Colo.

[73] Assignee: LSI Logic Corporation, Milpitas, Calif.

[21] Appl. No.: 599,569

[22] Filed: Feb. 9, 1996

[51] Int. Cl.[6] ............................. G08C 21/00; G09G 5/00
[52] U.S. Cl. ..................... 178/18.01; 178/18.02; 178/18.07; 178/20.03; 178/20.04; 345/174; 345/178
[58] Field of Search ..................... 345/173, 174, 345/178; 178/18.01, 18.02, 18.05, 18.07, 19.03, 20.01, 20.03, 20.04, 18.03

[56] References Cited

U.S. PATENT DOCUMENTS

| | | | |
|---|---|---|---|
| 3,609,237 | 9/1971 | Gerber et al. | 178/18 |
| 3,613,012 | 10/1971 | Feistel | 325/474 |
| 3,851,097 | 11/1974 | Rodgers | 178/19 |
| 4,510,624 | 4/1985 | Thompson et al. | 455/223 |
| 4,528,678 | 7/1985 | Udren | 375/104 |
| 4,555,669 | 11/1985 | Namiki | 330/149 |
| 4,577,161 | 3/1986 | Hirohashi et al. | 330/149 |
| 4,845,466 | 7/1989 | Hariton et al. | 340/310 |
| 5,170,489 | 12/1992 | Glaszebrook | 455/63 |
| 5,210,518 | 5/1993 | Graham et al. | 340/310 |
| 5,359,156 | 10/1994 | Chan et al. | 178/19 |
| 5,463,662 | 10/1995 | Sutterlin et al. | 375/351 |
| 5,574,262 | 11/1996 | Petty | 345/178 |

OTHER PUBLICATIONS

IBM Technical Disclosure Bulletin; vol. 38, No. 5, May 1, 1995, pp. 47–49; XP000519491; Pen Tablet Synchronizing Digitizer with Sample and Hold Window Locking.
Electronic Design; vol. 40, No. 22; Nov. 2, 1992; pp. 80–81, 84; Chip Set Simplifies the Design of Pen–Based PCS.

*Primary Examiner*—Vijay Shankar
*Attorney, Agent, or Firm*—Paul J. Maginot; Wayne P. Bailey

[57] ABSTRACT

A method for reducing the effect of a noise impulse in a digitizing panel which includes a resistive layer is disclosed. The method includes the steps of generating a signal when an object is in proximity to the digitizing panel, amplifying the signal with an amplifier, detecting the presence of the noise impulse coupled to the resistive layer, and disconnecting an input of the amplifier from the resistive layer in response to detecting the noise impulse. In addition, a digitizing panel is disclosed which includes a resistive layer for providing a signal when an object is in proximity to the digitizing panel.

16 Claims, 5 Drawing Sheets

METHOD AND APPARATUS FOR REDUCING NOISE IN AN ELECTROSTATIC DIGITIZING TABLET

BACKGROUND OF THE INVENTION

The present invention relates generally to digitizing tablets, and more particularly to a method and apparatus for reducing noise in an electrostatic digitizing tablet or panel associated with a computer.

Electrostatic digitizing panels having a resistive layer covered with a non-conductive plate such as glass, are known in the art. The known electrostatic digitizing tablets may operate in one of two modes, namely a touch mode or a pen mode. When operating in the touch mode, a computer is conventionally configured so as to bias the resistive layer with an AC signal. An object such as a user's finger that approaches and is in proximity to the non-conductive plate acts as a load that is capacitively coupled to the resistive layer. The capacitively coupled load causes electric current to flow through the corners of the resistive layer. The computer may determine a Cartesian coordinate (X, Y) position of an object relative to the digitizing panel, based on the current flow in each of the corners of the resistive layer in a manner known to one of ordinary skill in the art. More particularly, the position of the stylus relative to the digitizing panel may be determined based upon a ratio of the corner currents or signals that flow through the corners of the resistive layer due to the object being capacitively coupled to the resistive layer.

When operating in the pen mode, the computer is conventionally configured so as to be receptive to a signal transmitted from a hand-held pen or stylus. In particular, a stylus typically includes a battery portion which supplies power to an oscillator portion for stimulating a coil associated with a transmitter portion to transmit an AC signal from a tip of the stylus. The AC signal may be transmitted from the stylus tip when the tip is in proximity to the resistive layer associated with the digitizing panel. The transmitted AC signal is typically capacitively coupled to the resistive layer associated with the electrostatic digitizing panel. The capacitively coupled AC signal induces an electric current flow through each of the corners of the resistive layer in a known manner. As in the touch mode, the position of the stylus relative to the digitizing panel may then be determined in a known manner. The stylus position determination in the pen mode is based upon a ratio of the corner currents or signals that flow through the corners of the resistive layer due to the AC signal transmitted from the stylus.

One problem with known electrostatic digitizing panels is their susceptibility to the presence of large impulse-type noise sources that may be coupled to the resistive layer. It should be appreciated that the magnitude of the corner signals attributable to an object that is capacitively coupled to the resistive layer is very small compared to external noise sources that couple to the resistive layer. Typically, external noise sources are of two types, namely synchronous noise sources and asynchronous noise sources. Synchronous noise sources may be generated by subassemblies within or adjacent to the computer. For instance, digitizing panels typically overlay a display screen such as an LCD (liquid crystal display) or active matrix screen. The LCD screen generates switching noise which is caused by an M-field or commutating clock that produces a 30–40 Hz square wave for driving the LCD screen. When the square wave changes states, a relatively high (30 volt) signal transient may be coupled onto the resistive layer. On the other hand, asynchronous noise occurs randomly and is attributable to sources such as static electricity, EMI (electromagnetic interference), and the like. As with synchronous noise sources, asynchronous noise sources may also be coupled to the resistive layer.

Ideally, the digitizing panel should amplify the very small corner signal component (of a known frequency) attributable to an object that is in proximity to the digitizing panel, and should reject all other signals (such as the above-mentioned synchronous and asynchronous noise sources) outside a given bandwidth. The digitizing panel should also measure the amplitude of the corner signal with a high degree of precision in order to accurately determine the position of the object relative to the digitizing panel.

However, when amplifying very small signals in a noisy environment, large impulse-type noise sources may cause a high gain amplifier stage to enter a non-linear state thus affecting the ability of the digitizing panel to accurately determine the position of the object relative to the digitizing panel. This is because impulse-type noise may be several orders of magnitude larger than the intended input signal. The slow recovery time of the amplifier stage further increases the detrimental effect of noise impulses by extending the duration of the noise event beyond the time when the noise event is over.

What is needed therefore is an electrostatic digitizing panel that reduces, compensates for, or otherwise filters out, external noise signal components which would otherwise detrimentally affect a reported position of an object.

SUMMARY OF THE INVENTION

In accordance with one embodiment of the present invention, there is provided a method for reducing the effect of a noise impulse in a digitizing panel which includes a resistive layer. The method includes the steps of generating a signal when an object is in proximity to the digitizing panel, amplifying the signal with an amplifier, detecting the presence of the noise impulse coupled to the resistive layer, and disconnecting an input of the amplifier from the resistive layer in response to detecting the noise impulse.

Pursuant to another embodiment of the present invention, there is provided a digitizing panel including a resistive layer for providing a signal when an object is in proximity to the digitizing panel, an amplifier having an input connected to the resistive layer for amplifying the signal, a detector for detecting a noise impulse coupled to the resistive layer, and a mechanism for disconnecting the input of the amplifier from the resistive layer and connecting the input of the amplifier to a common reference source in response to detecting the noise impulse.

It is therefore an object of the present invention to provide a new and useful method for reducing noise in an electrostatic digitizing panel.

It is also an object of the present invention to provide an improved method for reducing noise interference in an electrostatic digitizing panel.

It is another object of the present invention to provide a new and useful digitizing panel for reducing noise in an electrostatic digitizing panel.

It is yet another object of the present invention to provide an improved digitizing panel for reducing noise in an electrostatic digitizing panel.

It is yet another object of this invention to provide a new and useful apparatus for minimizing the effect that large impulse-type noise sources have when measuring the amplitude of signals that are generated as a result of an object being in proximity to a digitizing panel.

It is yet another object of the present invention is to provide a new and useful method for temporarily disconnecting an input of an amplification stage from an input source and connecting the amplification stage to a reference potential for a pre-determined amount of time.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
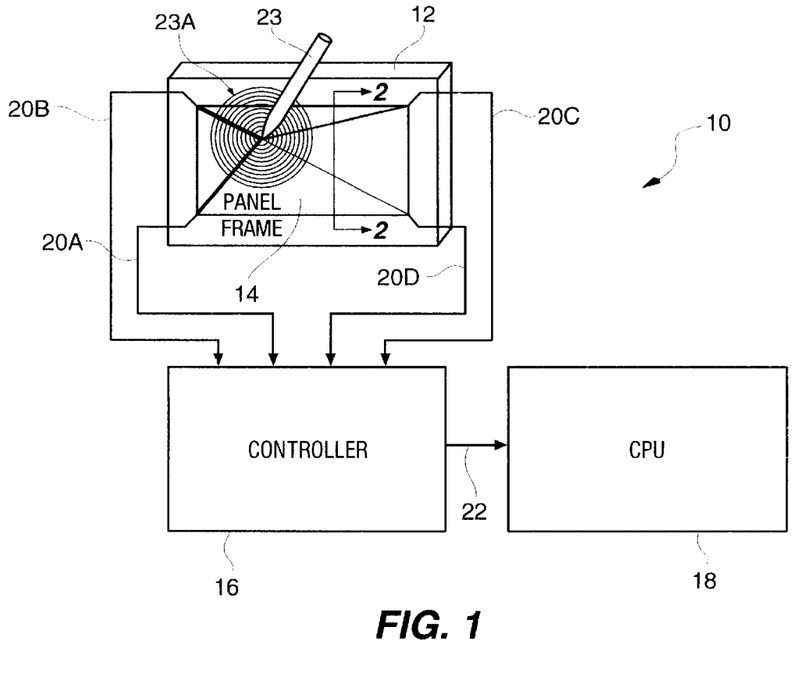
FIG. 1 is a functional block diagram of a computer having a digitizing panel which incorporates the features of the present invention therein.

Referring now to FIG. 1, there is shown a functional block diagram of a computer 10 such as a notebook or mobile computer which incorporates the features of the present invention therein. The computer 10 includes a base or frame 12, an electrostatic digitizing tablet or panel 14 secured to the frame 12, a controller 16, and a conventional central processing unit (CPU) 18. The digitizing panel 14 is operatively connected to the controller 16 through corner wires 20a–20d, and the controller 16 is operatively connected to the CPU 18 through a serial data line 22 such as a serial port.

A conventional hand-held pen or stylus 23 is used to input data into the computer 10 in a known manner, when the computer 10 is operating in a pen mode as described further below. The stylus 23 may be a cordless-type stylus having a battery portion (not shown) that supplies power to an oscillator portion (not shown) for stimulating a coil (not shown) associated with a transmitter portion (not shown) in order to transmit an AC signal 23a. In the embodiment being described, the signal 23a has a frequency of approximately 125 KHz.

Figure 2:
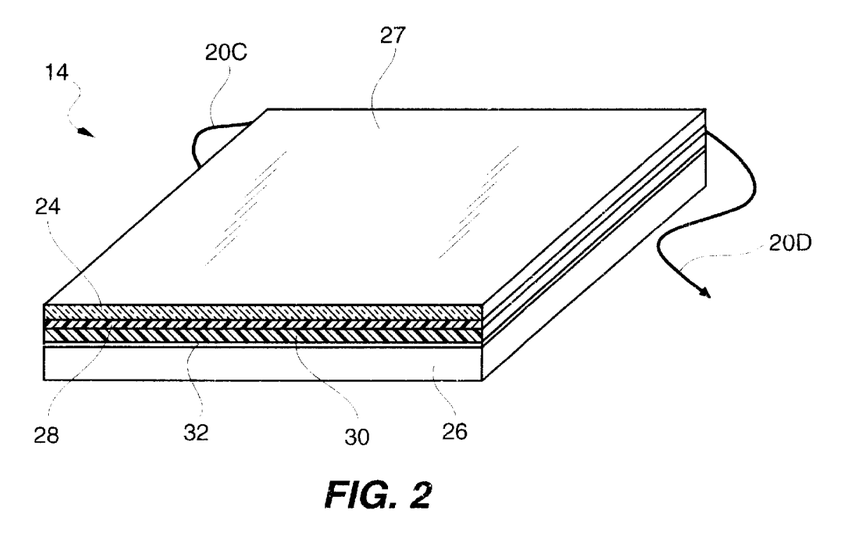
FIG. 2 is a perspective view of the digitizing panel taken along the line 2—2 in FIG. 1.

The electrostatic digitizing panel 14 may include several layers of known material as shown in FIG. 2. In the embodiment being described, a glass layer 24 protects an LCD (liquid crystal display) screen 26 which is disposed below the glass layer 24. An upper surface 27 of the glass layer 24 defines a writing/touching surface for an object such as the stylus 23 or a user's finger (not shown). A lower surface of the glass layer 24 has a layer 28 of an active sensor material applied thereto. In the embodiment being described, the active sensor material is a thin coating of transparent indium-tin-oxide (ITO) which is typically used in electrostatic digitizing panel applications.

Each corner wire 20a–20d is electrically connected to a respective corner of the active ITO layer 28 for carrying current flow generated as a result of an object being in proximity to the glass layer 24 as described further below. A polyester spall shield 30 is attached to the underside of the active ITO layer 28 to prevent the glass surface 24 from shattering if ever broken. An air gap 32 separates the lower surface of the spall shield 30 from an upper surface of the LCD screen 26.

The computer 10 may operate in one of two modes, namely a touch mode and a pen mode. In the touch mode of operation, the computer 10 is conventionally configured so as to bias the active ITO layer 28 with an AC signal from the controller 16. In particular, the controller 16 applies a 125 KHz biasing voltage to each corner of the active ITO layer 28 through the corner wires 20a–20d in a known manner. As long as an object is not approaching the digitizing panel 14, the computer 10 is in a quiescent state and a finite amount of DC offset current may flow through the corner wires 20a–20d due to loading effects caused by stray or parasitic capacitance between the active ITO layer 28 and any metal components of the computer 10 proximate the active ITO layer 28.

When an object does approach the digitizing panel 14, the object increasingly acts as a capacitive load that is coupled to the active ITO layer 28. An object that is capacitively coupled to the active ITO layer 28 acts as a load on the active ITO layer 28 which results in current flow through each of the corners of the active ITO layer 28, and through the corner wires 20a–20d. The controller 16 may determine a Cartesian coordinate (X, Y) position of an object such as a user's finger relative to the digitizing panel 14, based on the current flow in each of the corner wires 20a–20d in a manner known to one of ordinary skill in the art.

In the pen mode of operation, the computer 10 is conventionally configured so as to be receptive to the signal transmitted from the stylus 23. In particular, a current flow is generated in each of the corner wires 20a–20d in response to the signal transmitted from the stylus 23. The controller 16 may determine a Cartesian coordinate (X, Y) position of the stylus relative to the digitizing panel 14, based on the current flow in each of the corner wires 20a–20d in a manner known to one of ordinary skill in the art.

The magnitude of current flow through each of the corners of the active ITO layer 28 (and in each of the corner wires 20a–20d) due to an object (stylus or finger) which is capacitively coupled to the active ITO layer 28, is proportional to the conductivity of the active ITO layer 28 between each corner of the active ITO layer 28 and the object at a particular position on the glass layer 24 as shown in FIG. 1. More particularly, the relative thickness of the lines extending from the object position to each corner of the active ITO layer 28, is indicative of the magnitude of current flow through the respective corners of the active ITO layer 28 due to the position of the object relative to the active ITO layer 28.

Thus, the closer the object is to a particular corner of the active ITO layer 28, the greater the conductivity of the active ITO layer 28 and the greater the current flow through that corner, as depicted by the relative thickness of lines extending between the object position and each of the corners of the active ITO layer 28. Likewise, the farther the object is from a particular corner of the active ITO layer 28, the lower the conductivity of the active ITO layer 28, and the lower the current flow through that corner.

Figure 3:
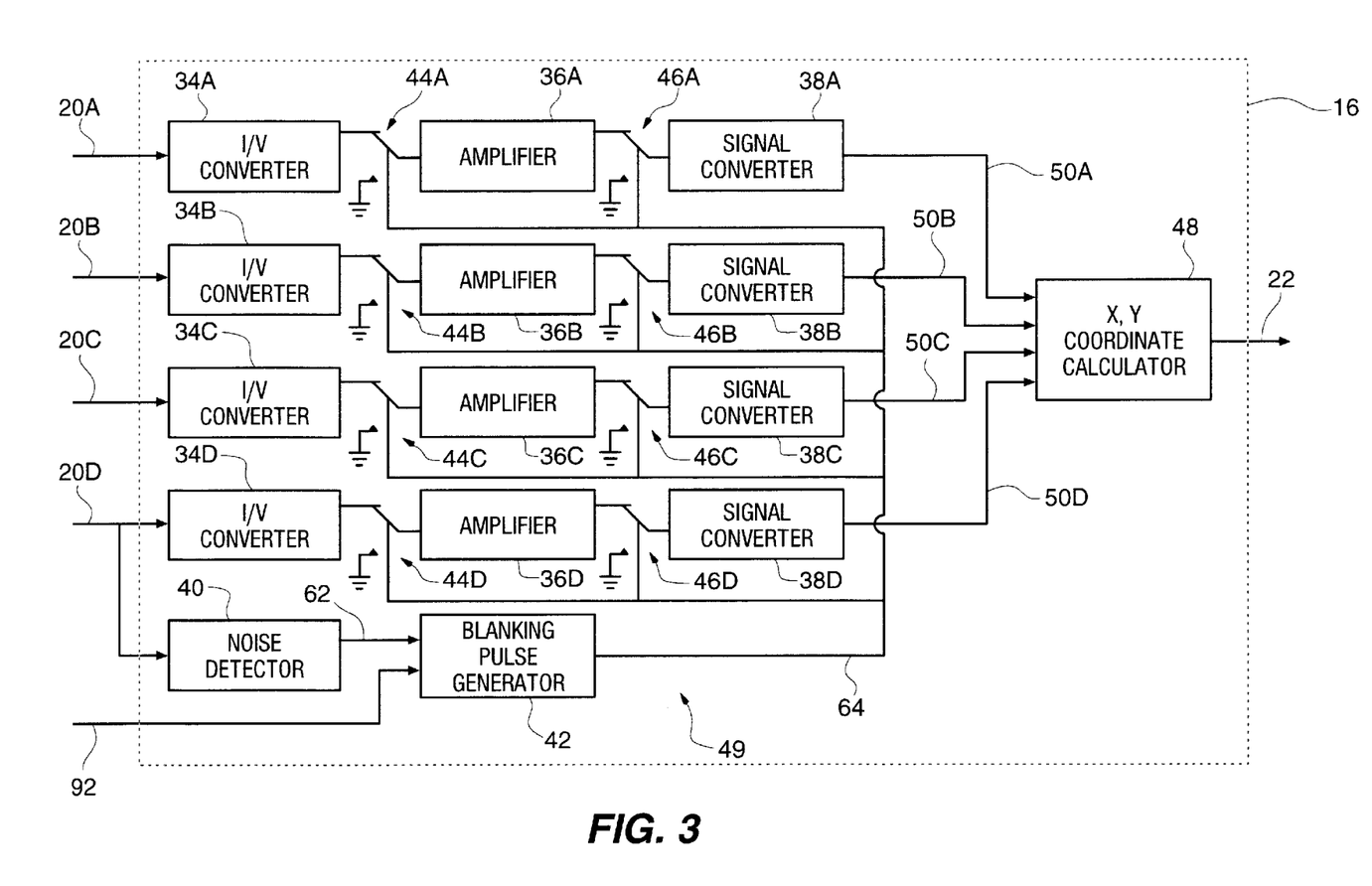
FIG. 3 is a block diagram of the controller shown in FIG. 1.

Referring now to FIG. 3, there is shown a simplified functional block diagram of the controller 16. In particular, the controller 16 includes a number of current-to-voltage (I/V) converters 34a–34d, amplifiers 36a–36d, signal converters 38a–38d, a noise detector 40, blanking pulse generator 42, input switches 44a–44d, output switches 46a–46d, and an X, Y coordinate calculator 48. It should be appreciated that the noise detector 40, blanking pulse generator 42, inputs switches 44a–44d and output switches 46a–46d cooperate to define a blanking circuit 49 of the controller 16.

The I/V converters or input detectors 34a–34d each have two functions. The first function of the I/V converters 34a–34d is to stimulate the active ITO layer 28 in the touch mode by providing a reference AC signal on the corner wires 20a–20d in a conventional manner. The second function of the I/V converters 34a–34d is to convert the current flowing through the corner wires 20a–20d into AC voltage signals on output terminals thereof in the pen and touch modes of operation.

It should be appreciated that the AC voltage signals on the outputs of the I/V converters 34a–34d have amplitudes (approximately 50 mV) which are indicative of the magnitude of current flowing through the respective corner wires 20a–20d. As previously described, the current flowing through the corner wires 20a–20d is substantially attributable to an object being in proximity to the digitizing panel 14. It should also be appreciated that the I/V converters 34a–34d may have a bandwidth on the order of 1–2 MHz which permits the I/V converters 34a–34d to recover quickly from any noise impulses on the inputs thereof regardless of the fact that the I/V converters 34a–34d may have a gain of approximately 10. Thus, a 1–5 mV input signal on the corner wires 20a–20d will be amplified to a 10–50 mV signal on the outputs of the I/V converters 34a–34d.

The input switches 44a–44d selectively couple the inputs of the amplifiers 36a–36d to either the outputs of the I/V converters 34a–34d, or to a common reference potential as described further below. The amplifiers 36a–36d conventionally amplify the AC voltage signals from the I/V converters 34a–34d when the input switches 44a–44d are configured so as to couple the outputs of the I/V converters 34a–34d to the inputs of the amplifiers 36a–36d.

In the embodiment being described, the amplifiers 36a–36d are high gain amplifiers which provide approximately 30 dB of gain for amplifying the AC voltage signals from the I/V converters 34a–34d. Thus, the amplifiers 36a–36d are susceptible to being driven into saturation from noise components on the corner wires 20a–20d which pass through the I/V converters 34a–34d. The output switches 46a–46d selectively couple the inputs of the signal converters 38a–38d to either the outputs of the amplifiers 36a–36d, or to the common reference potential as described further below.

The signal converters 38a–38d typically filter, rectify and convert the analog voltage signals that were amplified by the amplifiers 36a–36d into digital values in a known manner, prior to placing the digital values on lines 50a–50d. The digital values on lines 50a–50d have binary representations that are indicative of the magnitude of current flowing through the respective corner wires 20a–20d.

The X, Y coordinate calculator 48 inputs the digital values on lines 50a–50d for use in determining the Cartesian coordinates (X, Y) of the object relative to the digitizing panel 14 in a known manner. In particular, the position of an object relative to the digitizing panel 14 may be determined based upon a ratio of the digital values which represent the magnitudes of current flow through the corners of the active ITO layer 28, and the corner wires 20a–20d due to the presence of the object as described in detail above.

The noise or impulse detector 40 detects non-linear events or impulse signals such as voltage or noise spikes on one of the corner wires 20a–20d. When noise or other interference is coupled to the digitizing panel 14, the noise is commonly distributed throughout the active ITO layer 28 and among the four corner wires 20a–20d. Thus, the noise components on one corner wire 20 are indicative of the noise components on the remaining corner wires 20. In the embodiment being described, the noise detector 40 is connected to corner wire 20d in parallel with the I/V converter 34d. However, it should be appreciated that the noise detector 40 may alternately be connected to any one of the remaining corner wires 20a–20c in parallel with the respective I/V converter 34a–34c.

Figure 4:
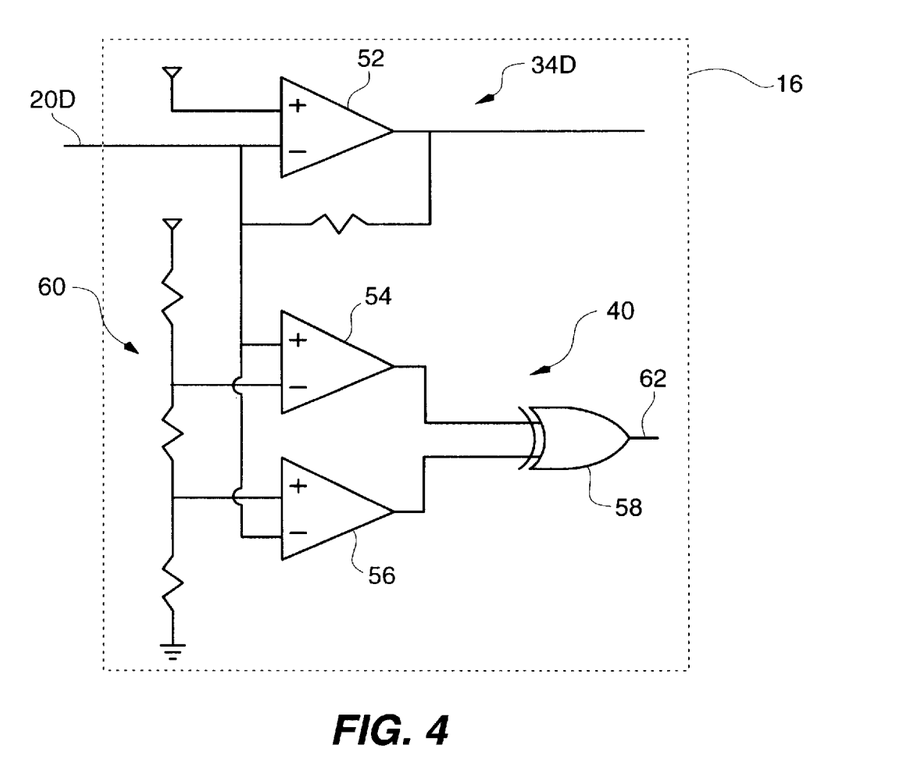
FIG. 4 is a schematic diagram of a noise detector associated with a blanking circuit of the controller of FIG. 1.

Referring now to FIG. 4, there is shown an exemplary schematic diagram for the noise detector 40. FIG. 4 also shows a schematic representation of the I/V converter 34d. The I/V converter 34d includes an amplifier 52 such as an operational amplifier (op amp) which is configured in a standard inverting mode with a negative feedback resister coupled between the output and the inverting input (–) thereof. The non-inverting input (+) of the amplifier 52 is connected to a positive reference potential such as approximately 2.2 volts.

The noise detector 40 includes a first amplifier 54, second amplifier 56 and an exclusive-OR (XOR) logic gate 58 which cooperate to define a conventional window comparator circuit arrangement. The window comparator is configured so as to generate a trigger pulse on an output line 62 when an input signal on the corner wire 20d rises above an upper threshold voltage level, or drops below a lower threshold voltage level. More specifically, the amplifier 52 has a non-inverting input or terminal (+) tied to the corner wire 20d, and an inverting input or terminal (–) tied to a resistive voltage divider arrangement 60 which provides a first reference voltage such as approximately 2.3v to the inverting input (–). Likewise, the amplifier 54 has an inverting input (–) tied to the corner wire 20d, and a non-inverting input (+) tied to the resistive voltage divider 62 which provides a second reference voltage such as approximately 2.1v to the non-inverting input (+).

The noise detector 40 monitors the inverting input (–) of the amplifier 52 to determine when the non-inverting input (+) and inverting input (–) of the amplifier 52 break lock, i.e. the voltage at the inverting input (–) is no longer equal to the voltage at the non-inverting input (+). Thus, when the voltage or signal on line 20d exceeds the first reference voltage, or drops below the second reference voltage a noise event on the corner wires 20a–20d is indicated, and the logic gate 58 will generate a trigger signal or pulse on the output line 60. It should be appreciated that the noise detector 40 may also be implemented as a rate of change (dv/dt) detector for determining when a rate of change of the signal on corner wire 20d exceeds a predetermined rate-of-change threshold which would indicate the present of a noise event.

In response to the trigger signal on line 60, the blanking pulse generator 42 produces a control signal or blanking pulse on an output line 64 for driving the input and output switches 44a–44d and 46a–46d. In particular, the blanking pulse on line 64 energizes the input switches 44a–44d so as to disconnect the inputs of the amplifiers 36a–36d from outputs of the I/V converters 34a–34d, and connect the inputs of the amplifiers 36a–36d to the common reference potential shown as ground for a predetermined amount of time. The blanking pulse on line 64 energizes the output switches 46a–46d so as to disconnect the inputs of the signal converters 38a–38d from the outputs of the amplifiers 36a–36d, and to connect the inputs of the signal converters 38a–38d to the common reference potential for the same predetermined amount of time.

Noise events or impulses that are coupled through the I/V converters 34a–34d to the amplifiers 36a–36d are prevented from reaching the X, Y coordinate generator 48, as a result of coupling the inputs of the amplifiers 36a–36d and inputs of the signal converters 38a–38d to the common reference potential. In addition, the effects of the noise impulses on the amplifiers 38a–38d are minimized as a result of coupling the inputs of the amplifiers 36a–36d to the common reference potential. Further, a common mode error is introduced into the X, Y coordinate calculator 48 by coupling the inputs of the signal generators 38a–38d to the common reference potential. It should be appreciated that the common mode error is less than, and preferable to, a coordinate measurement error caused by permitting a noise impulse to be coupled to the X, Y coordinate generator 48.

The blanking pulse generator 42 may be implemented as a conventional timing circuit (not shown) that operates from a high frequency clock source (not shown). In particular, the trigger signal from the noise detector 40 may reset a counter associated with the timing circuit to a pre-determined time period such that the timing circuit will "time-out" after the pre-determined time period has expired.

Figure 5:
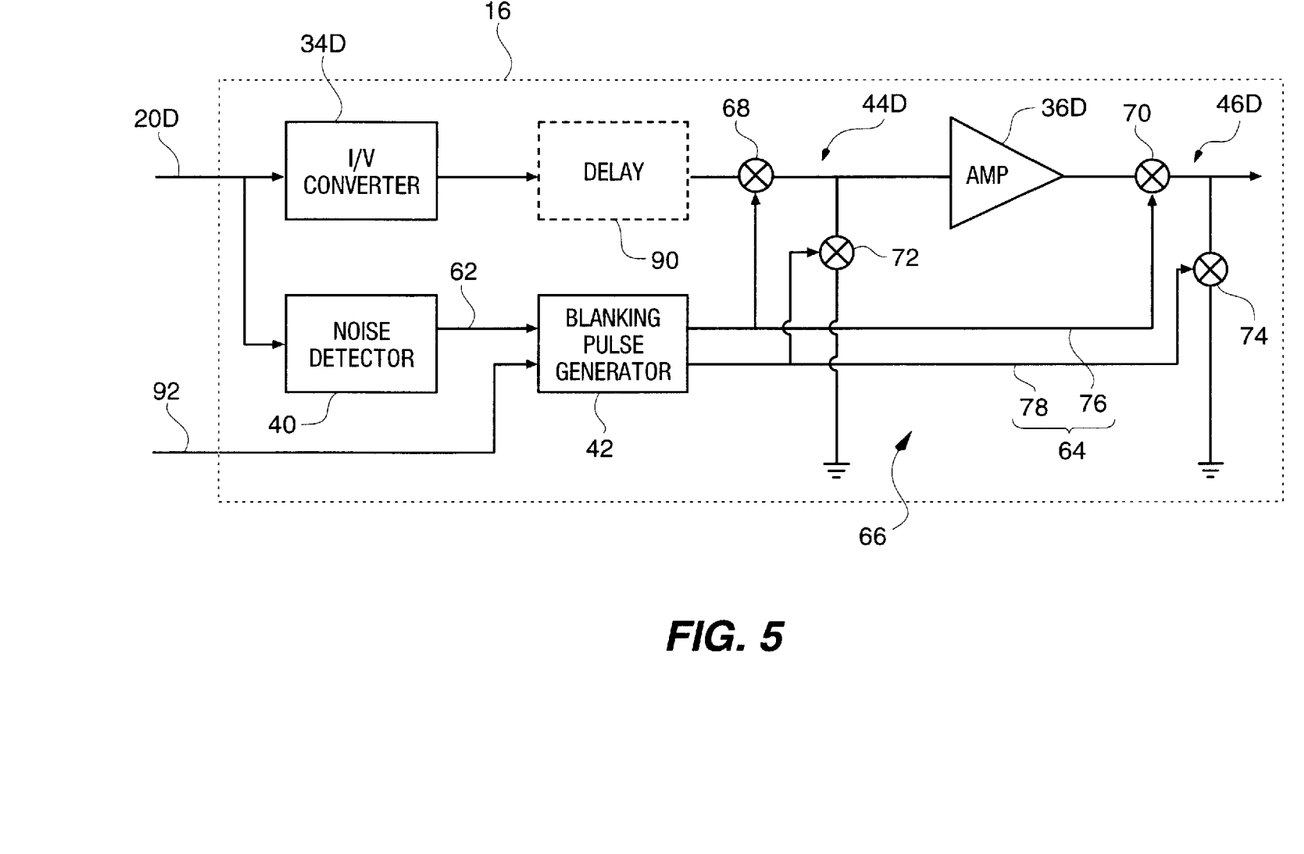
FIG. 5 is a block diagram showing a switching network associated with the blanking circuit of the controller of FIG. 1.

Referring now to FIG. 5, there is shown a block diagram of a switching network 66 associated with the blanking circuit 49. For ease of description, the switching network 66 will be described hereafter as being associated with corner wire 20d and the elements of the controller 16 that correspond with the corner wire 20d. However, it should be appreciated that the blanking circuit 49 includes four such switching networks 66 as described below, with each switching network 66 being associated with a respective corner wire 20a–20d and corresponding controller elements.

As shown in FIG. 5 the switching network 66 includes a first switch 68, second switch 70, third switch 72 and fourth switch 74. It should be appreciated that the first and third switches 68, 72 cooperate to define the input switch 44d, and that the second and fourth switches 70, 74 cooperate to define the output switch 46d. The output line 64 from the blanking pulse generator 42 includes a first control line 76 and a second control line 78. The first control line 76 is connected to the control inputs of switches 68 and 70, and the second control line 78 is connected to the control inputs of switches 72 and 74. In the embodiment being described, the switches 68, 70, 72 and 74 are implemented as conventional transmission gate switches.

In operation, when the blanking pulse generator 42 is in a quiescent state (i.e. a trigger signal from the noise detector is not received), the switching network 66 is configured so that the input to the amplifier 36d is connected to the output of the I/V converter 34d and isolated from the common reference potential. That is, the first switch 68 is in a closed position and the third switch 72 is in an open position. Thus, the switches 68, 72 may be normally-closed and normally-open switches, respectively, or control signals on lines 76, 78 from the blanking pulse generator 42 may hold the switches 68, 72 in the closed and open positions, respectively.

The switching network 66 is also configured so that the input of the signal converter 38d is connected to the output of the amplifier 36d and isolated from the common reference potential. That is, the second switch 70 is in a closed position and the fourth switch 74 is in an open position. Thus, the switches 70, 74 may be normally-closed and normally-open switches, respectively, or control signals on lines 76, 78 from the blanking pulse generator 42 may hold the switches 70, 74 in the closed and open positions, respectively.

When a noise event on corner wire 20d is detected by the noise detector 40, the trigger signal is sent to the blanking pulse generator 42 on line 62. In response thereto, the blanking pulse generator 42 simultaneously generates control signals on control lines 76, 78. The control signal generated on line 76 causes the switches 68, 70 to change from an open state to a closed state, thus disconnecting the input of the amplifier 38d from the output of the I/V converter 34d, and disconnecting the input of the signal converter 38d from the output of the amplifier 36d. The control signal generated on line 78 causes the switches 72, 74 to change from a closed state to an open state, thus connecting the input of the amplifier 36d and the input of the signal converter 38d to the common reference potential.

It should be appreciated that as the noise detector 40 detects the noise event and signals the occurrence thereof to the blanking pulse generator 42, the I/V converter 34 couples the noise event to the amplifier 36d which begins to saturate in response thereto. In addition, the slew rate of the amplifier 36d prevents an amplified portion of the noise event from passing to the signal converter 38d before the switches 70, 74 are caused to switch states. Thus, it is desirable for the noise detector 40 and the blanking pulse generator 42 to operate as quickly as possible (i.e. have low propagation times) to couple the inputs of the amplifier 36d and the signal converter 38d to the common reference potential. As previously mentioned, by quickly coupling the input of the amplifier to the common reference potential, the noise event is prevented from reaching the X, Y coordinate generator 42, and the effects of the noise event on the amplifier 36d is minimized. In addition, by coupling the input of the signal generator 38d to the common reference potential, a common mode error is introduced into the X, Y coordinate generator 48, which common mode error is less than the error caused to a noise impulse that was coupled through to the X, Y coordinate generator 48.

Referring now to FIGS. 6A–6D, there is shown a number of graphs illustrating the effect that a noise event can have on an output signal from an amplifier 36a–36d with and without the blanking circuit 49 present. In FIGS. 6A–6D, the voltage level 80 is indicative of the common reference potential. The voltage level 82 is indicative of the intended input signal range of the amplifiers 36a–36d, the voltage level 84 is the intended output signal range of the amplifiers 36a–36d, and the voltage level 86 is indicative of the voltage level of the power supply rails within the controller 16.

Figure 6A:
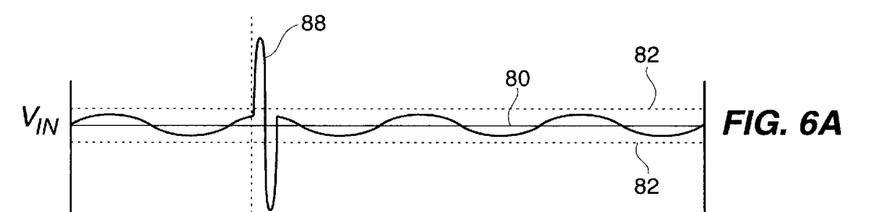
FIG. 6A is a graph showing an input signal that is applied to an amplifier shown in FIG. 3 without the blanking circuit present.

FIG. 6A shows an input signal that is applied to the amplifiers 36a–36d without the blanking circuit 49 present. In particular, the amplitude of the input signal remains within the intended input signal range 82 of the amplifiers 36a–36d until a synchronous or asynchronous noise event or impulse 88 occurs at a time $t_1$. It should be appreciated that the dynamic range of input for the amplifiers 36a–36d is orders of magnitude greater that the normal operational level thereof. For instance, the normal operational level of the amplifiers 36a–36d may be approximately 50 mV. However, a 1.0 volt noise impulse may be applied to the amplifiers 36a–36d. If one were to select an amplifier having a 1.0 volt dynamic range of input capability (i.e. not saturating), then the gain of that amplifier would not be high enough to amplify the corner signal components attributable to an object being in proximity to the digitizing panel 14.

Figure 6B:
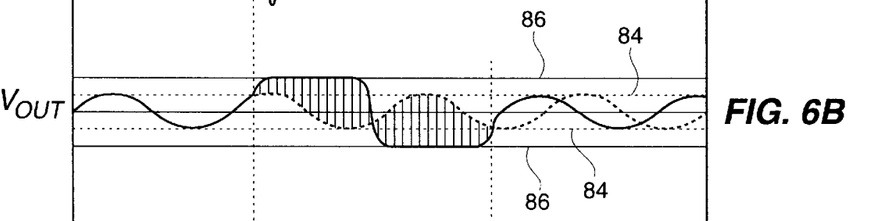
FIG. 6B is a graph showing an output signal from the amplifier without the blanking circuit present.

FIG. 6B shows an output signal from the amplifiers 36a–36d without the blanking circuit 49 present. At time $t_1$, the amplifiers 36a–36d begin to saturate and the output signal is driven into the power supply rails 86. At time $t_2$, the amplifiers recover and the linear output signal is restored. The shaded portion of the output signal from $t_1$ to $t_2$ is indicative of the error (loss of input signal) caused by the noise impulse 88 (FIG. 6A). It can be seen the duration of the noise impulse 88 (FIG. 6A) is less than the saturation time of the amplifier. Typically, an amplifier will be disturbed for ten times longer than the duration of the noise event. That is, for a 100 nanosecond noise event, it will take an amplifier 1 microsecond to recover and slew back to a normal output signal range 84.

Figure 6C:
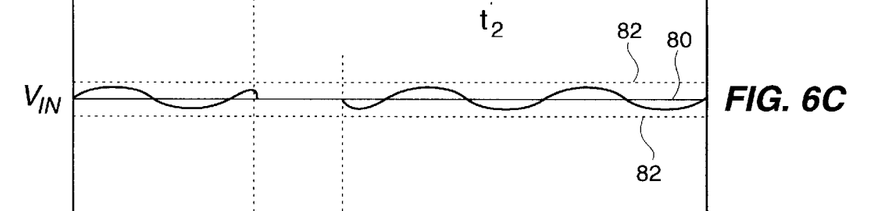
FIG. 6C is a graph showing an input signal that is applied to the amplifier shown in FIG. 3 with the blanking circuit present.

FIG. 6C shows an input signal that is applied to the amplifiers 36a–36d with the blanking circuit 49 present. At time $t_1$, the noise detector 40 detects the noise impulse 88 (FIG. 6A) on corner wire 20d and triggers the blanking pulse generator 42 to change the state of the switches 68, 70, 72 and 74 for a predetermined amount of time before changing the switches back to their original state. Thus, the amplifiers 36a–36d have their inputs connected to the common reference potential for the time period $t_1$ to $t_3$ as shown in FIG. 6A.

The time period $t_1$ to $t_3$ may be selected based upon the amount of time that is typically necessary for the amplifiers 36a–36d to recover or settle-out from the effects of amplifying the noise impulse 88 prior to being blanked by the switching network 66. In particular, approximately 30% of the noise impulse may reach the input to the amplifiers 36a–36d prior to the switches 68, 70, 72 and 74 changing states.

Even though approximately 30% of the noise impulse rise time may be amplified by the amplifiers 36a–36d, the amplifiers 36a–36d will still be able to recover faster than if 100% of the noise impulse 88 were permitted to be amplified by the amplifiers. Further, by switching the inputs of the signal converters 38a–38d to the common reference potential, any portion of the noise impulse 88 that does get amplified by the amplifiers 36a–36d will not be passed on to the signal converters 38a–38d. The blanking pulse generator 42 may be user programmable if so desired, in order to permit the time period $t_1$ to $t_3$ to be user selectable. A known delay element 90 (FIG. 5) can be used along the signal path between the outputs of the I/V converters 34a–34d and the switches 68 in order to delay the noise impulse just long enough for the switching network to change states such that no portion of the noise impulse 88 can be amplified by the amplifiers 36a–36d.

If the noise impulse 88 is from a synchronous, repetitive or predictable source, an external blanking request line 92 (FIG. 5) can be used to trigger the blanking circuit in the same manner as above with respect to the noise detector 40. Thus, the external blanking request line could be tied to a source of the synchronous noise such as an M-field clock associated with the LCD screen 26 such that the blanking circuit 49 can blank out any switching noise coupled to corner wires 20a–20d.

Figure 6D:
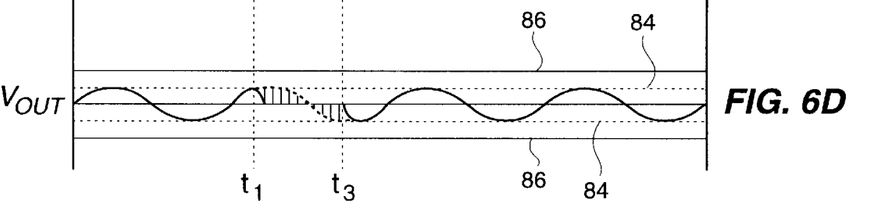
FIG. 6D is a graph showing the amount of error attributable to the blanking circuit when present.

FIG. 6D shows the amount of error (shaded portion) attributable to the blanking circuit 49 when present. It can be seen that the blanking circuit 49 minimizes the amount of error (loss of input signal) when a noise impulse occurs and permits the amplifiers 36a–36d to recover or settle-out faster.

What has been described above is an electrostatic digitizing panel having a blanking circuit which (1) disconnects an input signal from an amplifier input to minimize the energy delivered from a non-linear event such as a noise impulse; (2) connects the input of the amplifier input to a common reference potential to permit the amplifier to settle-out faster; (3) disconnects an output of the amplifier to prevent any non-linear signal from reaching a coordinate measurement system; and (4) connects the coordinate measurement system to the common reference potential to minimize errors by introducing a common mode error.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for reducing the effect of a noise impulse in a digitizing panel which includes a resistive layer, comprising the steps of:

generating a signal when an object is in proximity to the digitizing panel;

amplifying the signal with an amplifier;

detecting the presence of the noise impulse coupled to the resistive layer; and disconnecting an input of the amplifier from the resistive layer in response to detecting the noise impulse.

2. The method of claim 1, wherein the disconnecting step includes the step of:

temporarily disconnecting the input of the amplifier from the resistive layer and connecting the input of the amplifier to a common reference source for a predetermined amount of time.

3. The method of claim 1, wherein the disconnecting step includes the steps of:

providing a first switch connected between the resistive layer and the input of the amplifier;

providing a second switch connected between the input of the amplifier and a common reference potential; and causing each of the first and said second switches to change states in response to detecting the noise impulse.

4. The method of claim 3, wherein the causing step includes the steps of:

generating a blanking pulse in response to detecting the noise impulse; and applying the blanking pulse to the first and the second switches.

5. The method of claim 1, further including the step of:

disconnecting the input of the amplifier from the resistive layer and connecting the input of the amplifier to a common reference source in response to receiving a clock signal from a synchronous noise source.

6. The method of claim 5, wherein the disconnecting step includes the step of:

generating the clock signal with a clock associated with an LCD screen of the digitizing panel.

7. The method of claim 1, further including the steps of:

providing a signal converter which is connected to an output of the amplifier; and disconnecting an input of the signal converter from the output of the amplifier and connecting the input of the signal converter to a common reference potential in response to detecting the noise impulse.

8. The method of claim 7, further including the steps of:

providing a first switch connected between the resistive layer and the input of said amplifier, and a second switch connected between the input of the amplifier and the common reference potential;

providing a third switch connected between the output of the amplifier and the input of the signal converter, and a fourth switch connected between the input of the signal converter and the common reference potential; and causing each of the first, second, third and fourth switches to change states in response to detecting the noise impulse.

9. A digitizing panel comprising:

a resistive layer for providing a signal when an object is in proximity to said digitizing panel;

an amplifier having an input connected to said resistive layer for amplifying said signal;

a detector for detecting a noise impulse coupled to said resistive layer; and means for disconnecting said input of said amplifier from said resistive layer and connecting said input of said amplifier to a common reference source in response to detecting said noise impulse.

10. The digitizing panel of claim 9, wherein said means for disconnecting includes:

means for temporarily disconnecting said input of said amplifier from said resistive layer and connecting said input of said amplifier to said common reference source for a predetermined amount of time.

11. The digitizing panel of claim 9, wherein said means for disconnecting includes:

a first switch connected between said resistive layer and said input of said amplifier;

a second switch connected between said input of said amplifier and said common reference source; and means for causing each of said first and said second switches to change states in response to detecting said noise impulse.

12. The digitizing panel of claim 11, wherein said causing means includes:

means for generating a blanking pulse in response to detecting said noise impulse; and means for applying said blanking pulse to said first and said second switches.

13. The digitizing panel of claim 9, further including:

means for disconnecting said input of said amplifier from said resistive layer and connecting said input of said amplifier to said common reference source in response to receiving a clock signal from a synchronous noise source.

14. The digitizing panel of claim 13, wherein said clock signal is generated with a clock associated with an LCD screen of the digitizing panel.

15. The digitizing panel of claim 9, further including:

a signal converter connected to an output of said amplifier; and means for disconnecting an input of said signal converter from said output of said amplifier and connecting said input of said signal converter to said common reference source in response to detecting said noise impulse.

16. The digitizing panel of claim 15, wherein said means for disconnecting said input of said amplifier includes a first switch connected between said resistive layer and said input of said amplifier, and a second switch connected between said input of said amplifier and said common reference source;

wherein said means for disconnecting said input of said signal converter includes a third switch connected between said output of said amplifier and said input of said signal converter, and a fourth switch connected between said input of said signal converter and said common reference source; and wherein said digitizing panel further includes means for causing each of said first, second, third and fourth switches to change states in response to detecting said noise impulse.

* * * * *